(12) United States Patent
Zhong et al.

(10) Patent No.: US 8,009,809 B2
(45) Date of Patent: Aug. 30, 2011

(54) METHOD AND SYSTEM FOR CALL PROCEEDING IN AN INTELLIGENT NETWORK SYSTEM

(75) Inventors: Yongxin Zhong, Guangdong (CN);
Wensheng Xu, Guangdong (CN);
Xuanming Lu, Guangdong (CN);
Huarul Wang, Guangdong (CN);
Xiaodong Zhao, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1238 days.

(21) Appl. No.: 11/704,401

(22) Filed: Feb. 9, 2007

(65) Prior Publication Data

US 2007/0201619 A1 Aug. 30, 2007

Related U.S. Application Data

(63) Continuation of application No. PCT/CN2006/000005, filed on Jan. 5, 2006.

(30) Foreign Application Priority Data

Jan. 6, 2005 (CN) .......................... 2005 1 0000190

(51) Int. Cl.
*H04M 1/24* (2006.01)
*H04M 15/00* (2006.01)
*H04M 7/00* (2006.01)

(52) U.S. Cl. ............ 379/15.02; 379/112.02; 379/221.03

(58) Field of Classification Search .................. 379/1.01, 379/9, 9.05, 15.01, 15.02, 112.02, 221.03, 379/221.04

See application file for complete search history.

(56) References Cited

U.S. PATENT DOCUMENTS

| | | | |
|---|---|---|---|
| 6,072,857 A * | 6/2000 | Venkateshwaran et al. | 379/9 |
| 6,493,442 B1 * | 12/2002 | Goldman et al. | 379/207.02 |
| 6,629,263 B1 * | 9/2003 | Sassi | 714/15 |
| 6,763,101 B2 | 7/2004 | Lautenschlager et al. | 379/207.02 |
| 6,788,777 B2 | 9/2004 | Goldman et al. | 379/221.08 |
| 2002/0018551 A1* | 2/2002 | Sainio | 379/219 |
| 2003/0165228 A1* | 9/2003 | Goldman et al. | 379/221.08 |

FOREIGN PATENT DOCUMENTS

| | | |
|---|---|---|
| CN | 1242908 A | 1/2000 |
| CN | 1514656 A | 7/2004 |
| WO | WO 98/27753 | 6/1998 |

OTHER PUBLICATIONS

Examination Report for Application No. GB0702885.5, dated May 21, 2008.
International Preliminary Report on Patentability for International Application No. PCT/CN2006/000005, dated Jul. 10, 2007.
Written Opinion for International Application No. PCT/CN2006/000005, dated Feb. 28, 2006.
International Search Report for International Application No. PCT/CN2006/000005, dated Apr. 6, 2006.

* cited by examiner

*Primary Examiner* — Quoc D Tran
(74) *Attorney, Agent, or Firm* — Huawei Technologies Co., Ltd.

(57) ABSTRACT

Embodiments of the invention disclose a method for call proceeding in an intelligent network system, which includes the following steps: receiving a service request from an exchange device; instructing the exchange device to proceed calling when a malfunction occurs at an intelligent network device. The invention also discloses an intelligent network system for call proceeding, a Service Control Point (SCP) for call proceeding, a malfunction processing apparatus.

13 Claims, 6 Drawing Sheets

METHOD AND SYSTEM FOR CALL PROCEEDING IN AN INTELLIGENT NETWORK SYSTEM

CROSS-REFERENCES TO RELATED APPLICATION

This is a continuation of International Application No. PCT/CN2006/000005 filed Jan. 5, 2006, which claims the priority benefit of Chinese Patent Application No. 200510000190.8, filed Jan. 6, 2005, the entire respective disclosures of which are hereby incorporated herein by reference.

BACKGROUND OF THE DISCLOSURE

1. Field of the Technology

The invention relates to the intelligent network communication technique, and particularly, to a method and system for call proceeding in an intelligent network system.

2. Related Technology

Along with wide application of the intelligent network systems in communication systems and fast development of the intelligent services and increase of the number of subscribers, the processing of the calling of the intelligent network subscribers more and more depends on the intelligent network systems, that is, signaling generated in the calling procedure of the intelligent network subscribers must be normally dealt with and responded by a intelligent network device to guarantee implementation of intelligent services and normal proceeding of calls.

The mainly intelligent network device that implements intelligent functions is service control point (SCP). In the related art, after SCP receiving call related information sent by the exchange device of the subscriber, if an important component of the SCP, such as a service data unit (SDU) or a database, malfunctions and the SCP can not perform intelligent services of a subscriber, the SCP will usually send a call rejection message to the exchange device of the subscriber. Then, the exchange device of the subscriber will reject the call after receiving the message.

Seen from the above technical solution, in the related art, all intelligent services for the intelligent network subscribers having subscribed to the SCP will fail after the SCP malfunctions. As a result, calls of such intelligent network subscribers can not be proceeded, which causes huge losses to both operators and the subscribers.

SUMMARY OF THE INVENTION

Embodiments of the invention provide a method and system for call proceeding in intelligent network, which are capable of call proceeding when SCP malfunctions. An SCP for call proceeding and a malfunction processing apparatus are also disclosed in the embodiments of the invention.

A method for call proceeding in an intelligent network includes: receiving a service request from an exchange device; instructing the exchange device to proceed calling when a malfunction occurs at an intelligent network device.

An intelligent network system for call proceeding includes: an exchange device which is used for sending a service request; a malfunction processing apparatus which is used for instructing the exchange device to proceed calling according to the service request when there is the malfunction occurring at an intelligent network device.

An SCP for call proceeding includes a service processing module which is used for receiving a service request from an exchange device and determining whether there is a malfunction in the SCP; and a malfunction processing module which is used for instructing the exchange device to proceed calling when there is a malfunction in the SCP.

A malfunction processing apparatus includes a component configured to receive a service request from an exchange device, determine whether there is a malfunction occurring at an intelligent network device, and instruct the exchange device to proceed calling when there is the malfunction occurring at the intelligent network device.

As seen from the above technical solution, the intelligent network device sends a message to the exchange device to notify the exchange device performing the call processing after detecting its own malfunction. Therefore, calls would still be proceeded after the intelligent network device malfunctions, thus reducing losses of the subscribers and the operator.

DETAILED DESCRIPTION OF THE PREFERRED EMBODIMENTS

The invention is hereinafter described in detail with reference to the accompanying drawings and embodiments.

According to embodiments of the invention, an intelligent network device determines whether the intelligent network device malfunctions upon receiving a service request from exchange device. If the intelligent network device malfunctions, the intelligent network device returns a message to the exchange device to instruct the exchange device to proceed the calling, then the exchange device proceeds the calling upon receiving the message; otherwise, normal intelligent service processing procedure is performed.

Figure 1:
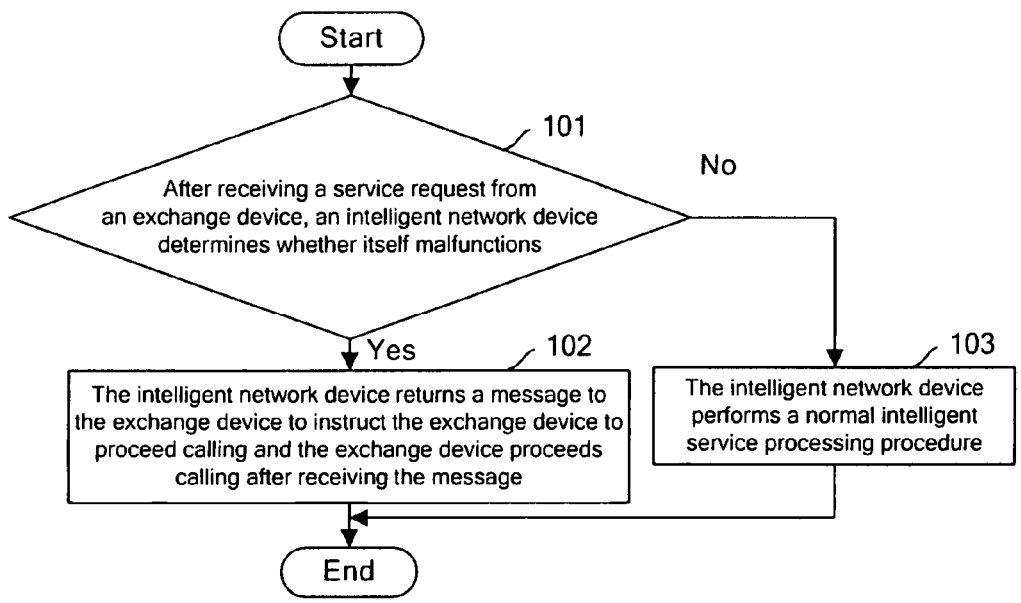
FIG. 1 shows a general flow chart of an embodiment of the invention.

The general flow chart of the method in accordance with an embodiment of the invention is shown in FIG. 1 and the specific steps are as follows.

Step 101: after receiving a service request from an exchange device, an intelligent network device determines whether the intelligent network device malfunctions, if the intelligent network device malfunctions, proceed to Step 102; otherwise, proceed to Step 103;

Step 102: the intelligent network device returns a message to the exchange device to instruct the exchange device to proceed calling and the exchange device proceeds calling after receiving the message;

Step 103: the intelligent network device performs a normal intelligent service processing procedure.

The intelligent network device may be an intelligent network device to which the calling party has subscribed, or an intelligent network device to which the called party has subscribed.

The invention is hereinafter further described by specific embodiments.

A first embodiment implements the method in accordance with the invention in a Global System for Mobile Communication (GSM) intelligent network. In this embodiment, a malfunction processing module and a malfunction indicating bit are set in an SCP in advance. When a component of the SCP such as an SDU or a database malfunctions, calls can still be proceeded by the malfunction processing module as long as the service control unit (SCU) of the SCP can function normally. This embodiment is hereinafter described in two cases when an intelligent network subscriber is a caller or a callee respectively.

Figure 2:
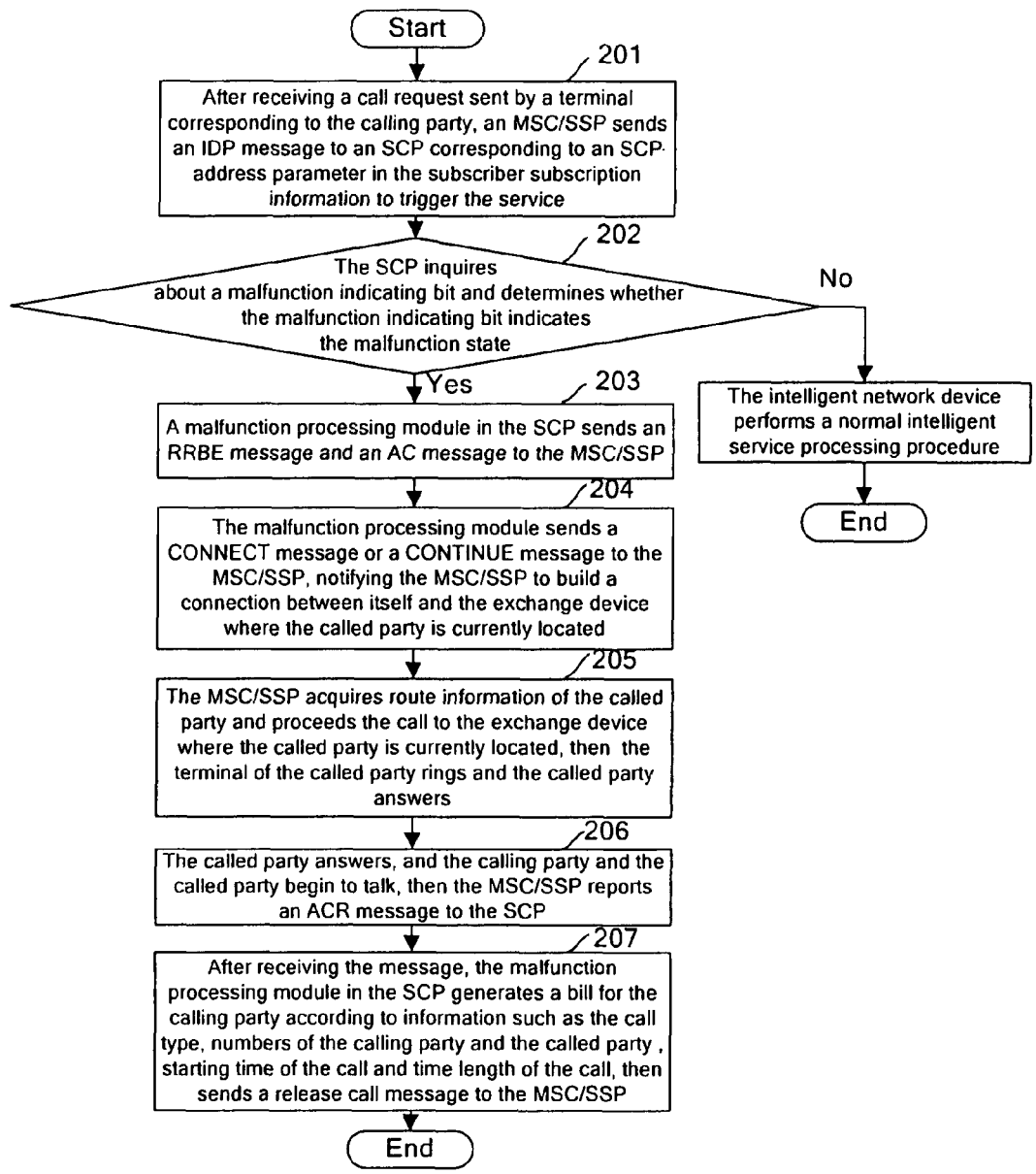
FIG. 2 shows a chart illustrating the calling flow of a first embodiment of the invention.

In the case that the intelligent network subscriber is the caller, the implementation procedure is shown in FIG. 2 and the specific steps are as follows.

Step 201: an intelligent network subscriber initiates a call as the calling party, and the exchange device such as a mobile switching centre or service switching point (MSC/SSP), detects that the subscriber is an intelligent subscriber according to the subscription information of the calling party after receiving a call request sent by a terminal corresponding to the calling party. And the exchange device sends an initial detection point (IDP) message including the information related to the call to the SCP, which is corresponding to the address parameter in the subscriber subscription information, so that, the SCP to which the caller has subscribed triggers the service.

Step 202: after receiving the IDP message sent by the MSC/SSP, the SCP inquires about the malfunction indicating bit in the message and determines whether the malfunction indicating bit indicates the malfunction state. If the malfunction indicating bit indicates the malfunction state, proceed to Step 203; otherwise, a normal intelligent service processing procedure is performed.

In the SCP, the malfunction indicating bit is set to the malfunction state when the SCP fails to proceed the service data unit or the database, and is set to the normal state when the SCP succeeds in proceeding the service data unit or the database.

Step 203: the malfunction processing module in the SCP sends a request report BCSM event (RRBE) message in the manner of processing an ordinary call with the basic call state model to be reported configured, and sends an apply charging (AC) message to the MSC/SSP.

The malfunction processing module in the embodiment is a software module which can be set in each service processing module in the SCP. In Step 202, a main program in a service processing module determines whether the SCP malfunctions. If the main program determines that the SCP malfunctions, the procedure turns to the malfunction processing module and the malfunction processing module deals with the procedure. Otherwise, the original normal service process is performed. The malfunction processing module can also be a service software module set separately in the SCP. In Step 202, a service processing module determines whether the SCP malfunctions, and invokes the malfunction processing module if determines that the SCP malfunctions, then the malfunction processing module performs the follow-up procedures. Otherwise, the original normal service process is performed.

In addition, in this step, a fee charging information (FCI) message can also be sent to the MSC/SSP. Whether the FCI message is sent is determined according to the manner in which the operator chooses a bill when charging. Specifically, the FCI message is sent if the manner is that the bill is chosen by the FCI, and if the manner is that the bill is chosen by a service key, the FCI message need not be sent because the service key has already been included in the subscription information in the MSC.

Step 204: the malfunction processing module sends a connect (CONNECT) message or a continue (CONTINUE) message to the MSC/SSP, notifies the MSC/SSP to build a connection between the MSC/SSP and the exchange device where the called party is currently located.

Step 205: the MSC/SSP acquires the route information of the called party and proceeds the call to the exchange device where the called party is currently located, then the terminal of the called party rings and the called party answers.

In this step, the method for acquiring the route information of the called party is determined according to the home system of the called party, such as a GSM, a Code Division Multiple Addressing (CDMA) system, and the specific implementation method is the same as that in the prior art and will not be described in detail herein.

Step 206: the called party answers, and the calling party and the called party begin to talk. The MSC/SSP reports an apply charging report (ACR) message to the SCP upon the call being terminated.

Step 207: after receiving the message, the malfunction processing module in the SCP generates a bill for the calling party according to such information as the call type, numbers of the calling party and the called party, starting time of the call and time length of the call, then sends a release call message to the MSC/SSP.

Figure 3:
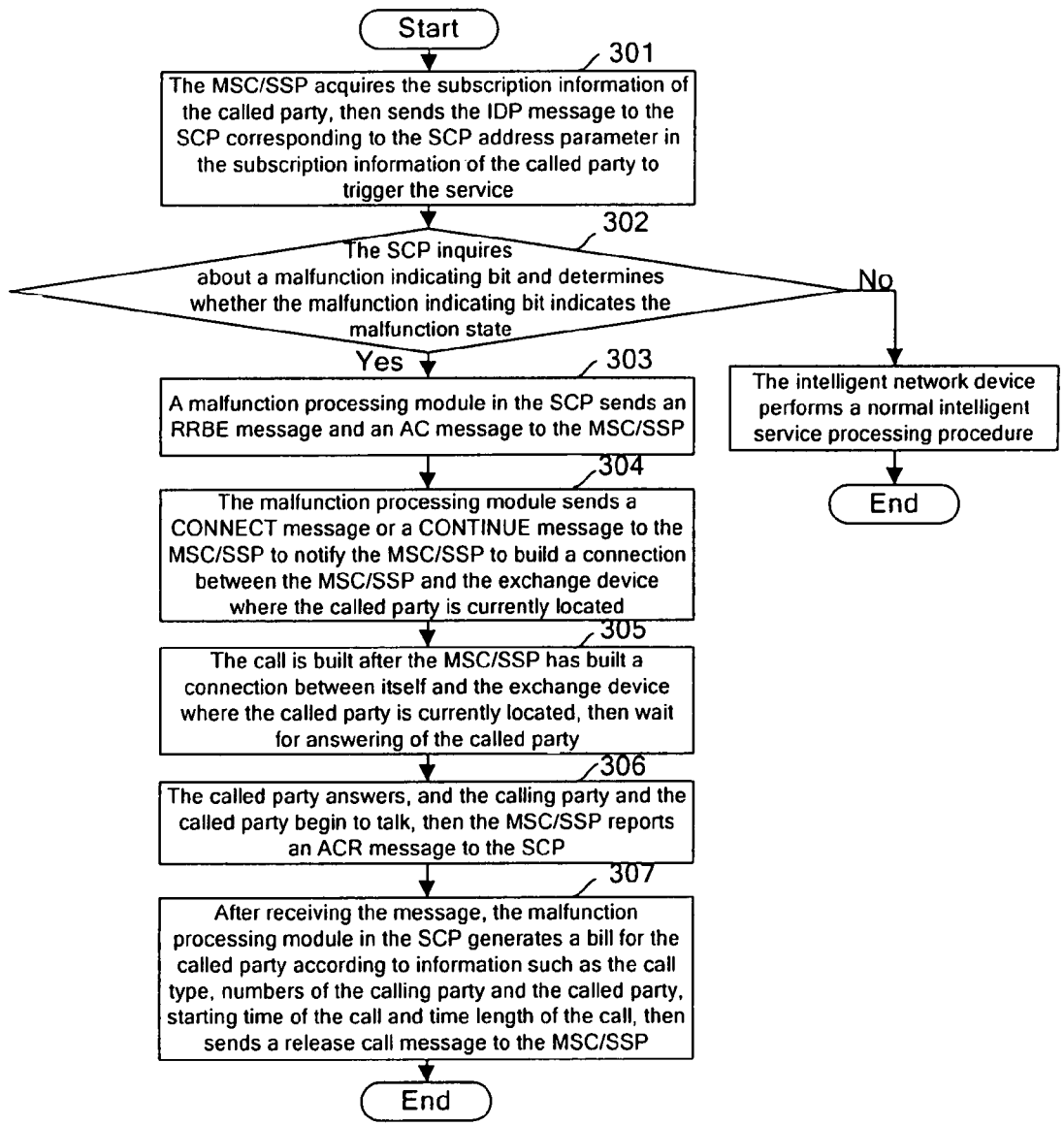
FIG. 3 shows a chart illustrating the called flow of the first embodiment of the invention.

In the case that the intelligent network subscriber is the called party, the implementation procedure is shown in FIG. 3 and the specific steps are substantially the same with the above calling procedure. There are small differences in Step 301, Step 305 and Step 307. In Step 301, the MSC/SSP sends the IDP message to the SCP to which the called party has subscribed according to the SCP address parameter in the subscription information after acquiring the subscription information of the called party; in Step 305, the call is proceeded to the exchange device where the called party is currently located; in step 307, the malfunction processing module in the home SCP of the called party generates a bill for the called party. The above description is for the first embodiment of the invention. In this embodiment, the SCP can also carry out the job of the malfunction processing module directly without setting the malfunction processing module.

In the existing intelligent network, there is a Virtual Private Network (VPN) short number service in general. A VPN short number is a number starting with a number except for 0, 1, 2, 9 and the size thereof is not larger than 6 digits. In the VPN short number service, in the case that a number of a called party that a calling party dials is a VPN number, the actual number corresponding to the called VPN short number can be acquired by inquiring about a service data unit or a database by an SCP. Therefore, in the case that the called number is a VPN short number, the procedure in the first embodiment does not work. Hence, a second embodiment of the invention is proposed and hereinafter described.

Figure 4:
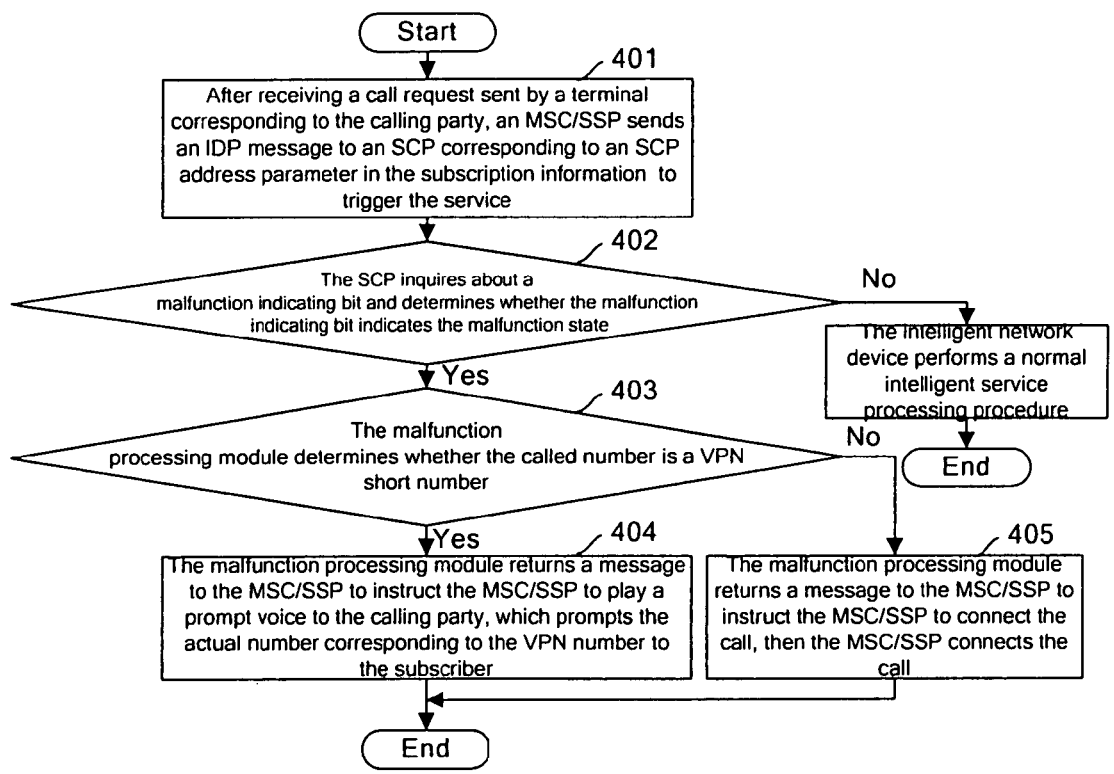
FIG. 4 shows a chart illustrating the calling flow of a second embodiment of the invention.

In the second embodiment of the invention, the differences exist between the calling procedure of itself and that of the first embodiment. The calling procedure in this embodiment is shown in FIG. 4, in which Step 401 and 402 are the same with Step 201 and Step 202 in the first embodiment. After determining that the malfunction indicating bit indicates the malfunction state in Step 402, the following steps are performed:

Step 403. the malfunction processing module determines whether the called number is a VPN short number, if the called number is a VPN short number, proceed to Step 404; otherwise, proceed to Step 405.

Step 404: the malfunction processing module returns a message to the MSC/SSP to instruct the MSC/SSP to play a prompt voice, which prompts the actual number corresponding to the VPN number to the subscriber, to the calling party.

Since an intelligent peripheral (IP) can also play a prompt voice to a subscriber as a voice playing device, the malfunction processing module can also return a message to an intelligent peripheral to instruct the intelligent peripheral to play a prompt voice to the calling party in this Step, then the intelligent peripheral plays the prompt voice to the subscriber. In addition, it is needed to play a prompt voice prompting dialing an actual number to a subscriber after an SCP malfunctions and cannot acquire the actual number by inquiring about a service data unit or a database. This is because a call can be proceeded after acquiring an actual number corresponding to a VPN short number and the actual number corresponding to the VPN short number can be acquired by inquiring about the service data unit or the database.

Step 405: the malfunction processing module returns a message to the MSC/SSP to instruct the MSC/SSP to proceed the call, then the MSC/SSP proceeds the call; In fact, what this step performs is from Step 203 to Step 207 shown in FIG. 2.

Figure 5:
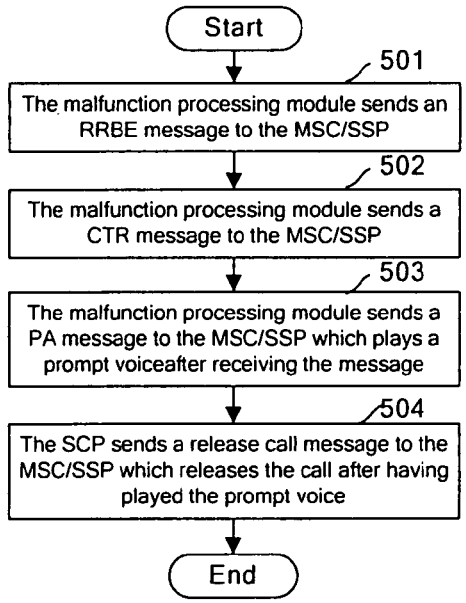
FIG. 5 shows a chart illustrating the flow of playing a prompt voice to the calling party in the second embodiment of the invention.

In the above Step 404, a flow chart for returning the message to the MSC/SSP to instruct the MSC/SSP to play the prompt voice to the calling party by the malfunction processing module is shown in FIG. 5 and the specific steps are as follows.

Step 501: the malfunction processing module sends an RRBE message to the MSC/SSP, and configures the basic call state model (BCSM) which the calling party needs to report. What is configured herein is mainly the calling party giving up events such as hanging up of the calling party; the MSC/SSP sends a message to the SCP to notify the SCP to give up the call of the calling party, then the SCP stops dealing with the call.

Step 502: the malfunction processing module sends a connect to resource (CTR) message to the MSC/SSP to notify the MSC/SSP to build a connection with a resource for playing the prompt voice.

Step 503: the malfunction processing module in the SCP sends a play announcement (PA) message to the MSC/SSP, the MSC/SSP plays a prompt voice corresponding to a recorded notification voice number included in the play announcement message after receiving the play announcement message.

In this step, the play announcement message includes a type, that is, the recorded notification voice number, of the prompt voice that is to be played to the calling party by the MSC/SSP. The voice number used in this embodiment can be a voice number not used temporarily for the moment in the standard voices and added standard voices.

Step 504: the calling SCP sends a release call (RC) message to the MSC/SSP to release the call, and the MSC/SSP releases the call after the playing the prompt voice terminates.

A third embodiment of the invention implements the method in accordance with the invention in a CDMA intelligent network system. The idea of the third embodiment is the same with the first embodiment and the second embodiment, and differences are in the signaling procedure. The third embodiment is hereinafter described.

Figure 6:
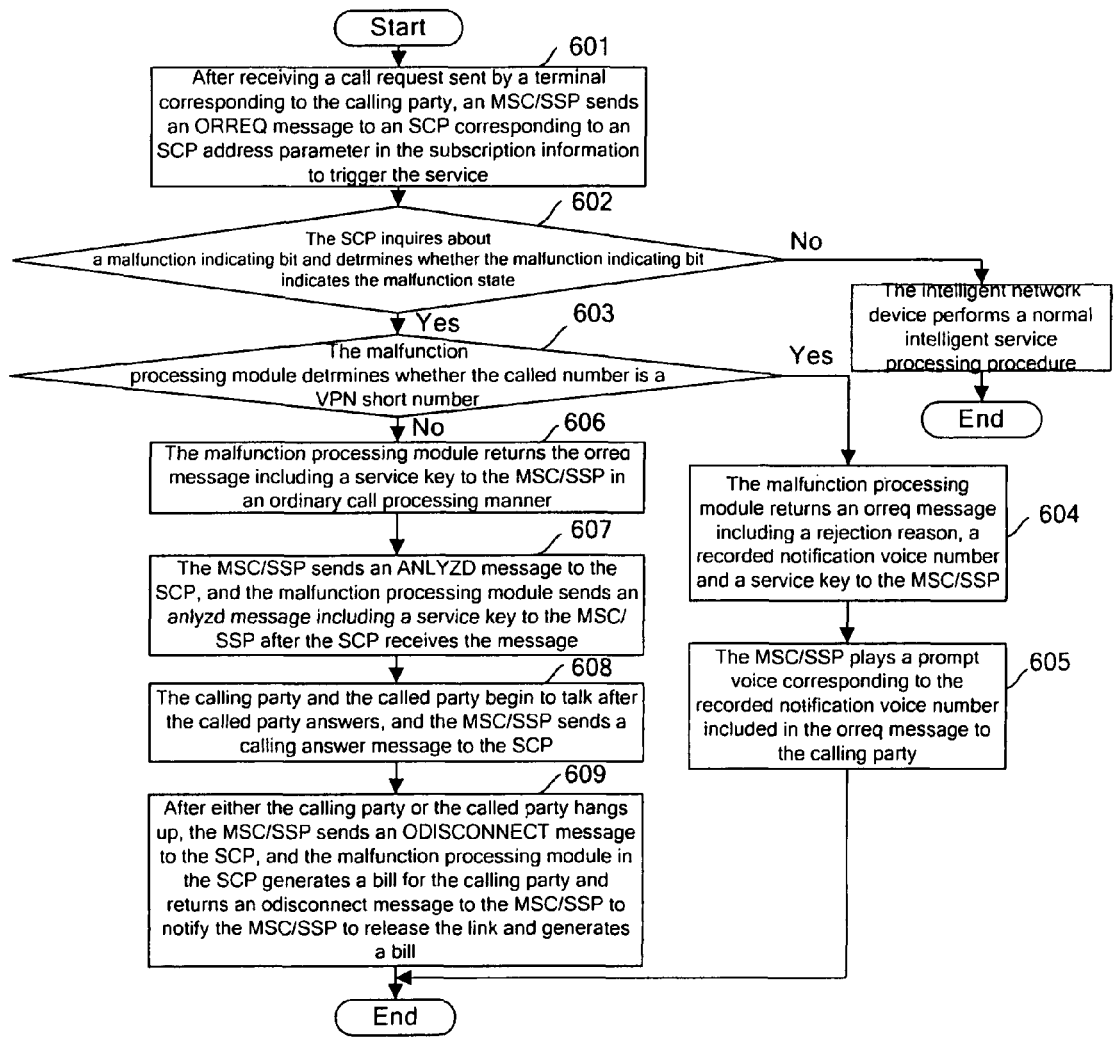
FIG. 6 shows a chart illustrating the calling flow of a third embodiment of the invention.

The calling procedure of this embodiment is shown in FIG. 6 and the specific steps are as follows.

Step 601: an intelligent network subscriber initiates a call as a calling party, and a calling MSC/SSP detects that the subscriber is an intelligent network subscriber according to the subscription information after receiving a call request sent by the terminal corresponding to the calling party. And the MSC/SSP sends an origination request (ORREQ) message including the call related information to an SCP to trigger the service; the SCP is corresponding to an SCP address parameter in the subscriber subscription information.

Step 602: after receiving the ORREQ message sent by the MSC/SSP, the SCP inquires about the malfunction indicating bit and determines whether the malfunction indicating bit indicates the malfunction state, if the malfunction indicating bit indicates the malfunction state, proceed to Step 603; otherwise, a normal intelligent service processing procedure is performed.

Step 603: the malfunction processing module in the SCP determines whether the called number is a VPN short number, if the called number is a VPN short number, proceed to Step 604; otherwise, proceed to Step 606.

Step 604: the malfunction processing module returns an origination request response message (orreq) rejecting the call to the MSC/SSP, the orreq includes a rejection reason, a recorded notification voice number and a service key.

Step 605: the MSC/SSP plays a prompt voice corresponding to the recorded notification voice number included in the orreq to the calling party, and the current procedure is terminated.

Playing the prompt voice to the calling party in this step can also be performed by an intelligent peripheral. The procedure for playing the voice is the same with that in the prior art and will not be described in detail herein.

Step 606: the malfunction processing module in the SCP returns the orreq including a service key (DWH_SVCID), which is used for distinguishing the bill of the call from bills of other calls when adopting a manner of choosing a bill with the service key, to the MSC/SSP in an ordinary call processing manner.

Step 607: the MSC/SSP sends an analyzing message (ANLYZD) to the SCP after acquiring information of the called party and determining availability of the called party, and the malfunction processing module in the SCP sends an analyzing response message (anlyzd) with a service key to the MSC/SSP after receiving the message, then the MSC/SSP waits for answering of the called party.

In this step, the method for acquiring the information of the called party is the same with that in the prior art and the availability of the called party means that the calling party can build a connection with the called party.

Step 608: the calling party and the called party begin to talk after the called party answers, and the MSC/SSP sends a calling answer message (OANSWER) to the SCP.

Step 609: after either the calling party or the called party hangs up, the MSC/SSP sends a calling release message (ODISCONNECT) to the SCP, and the malfunction processing module in the SCP generates a bill for the calling party and returns a calling release response message (odisconnect) to the MSC/SSP to notify the MSC/SSP to release the link and generates a bill, then the Current procedure is terminated.

Figure 7:
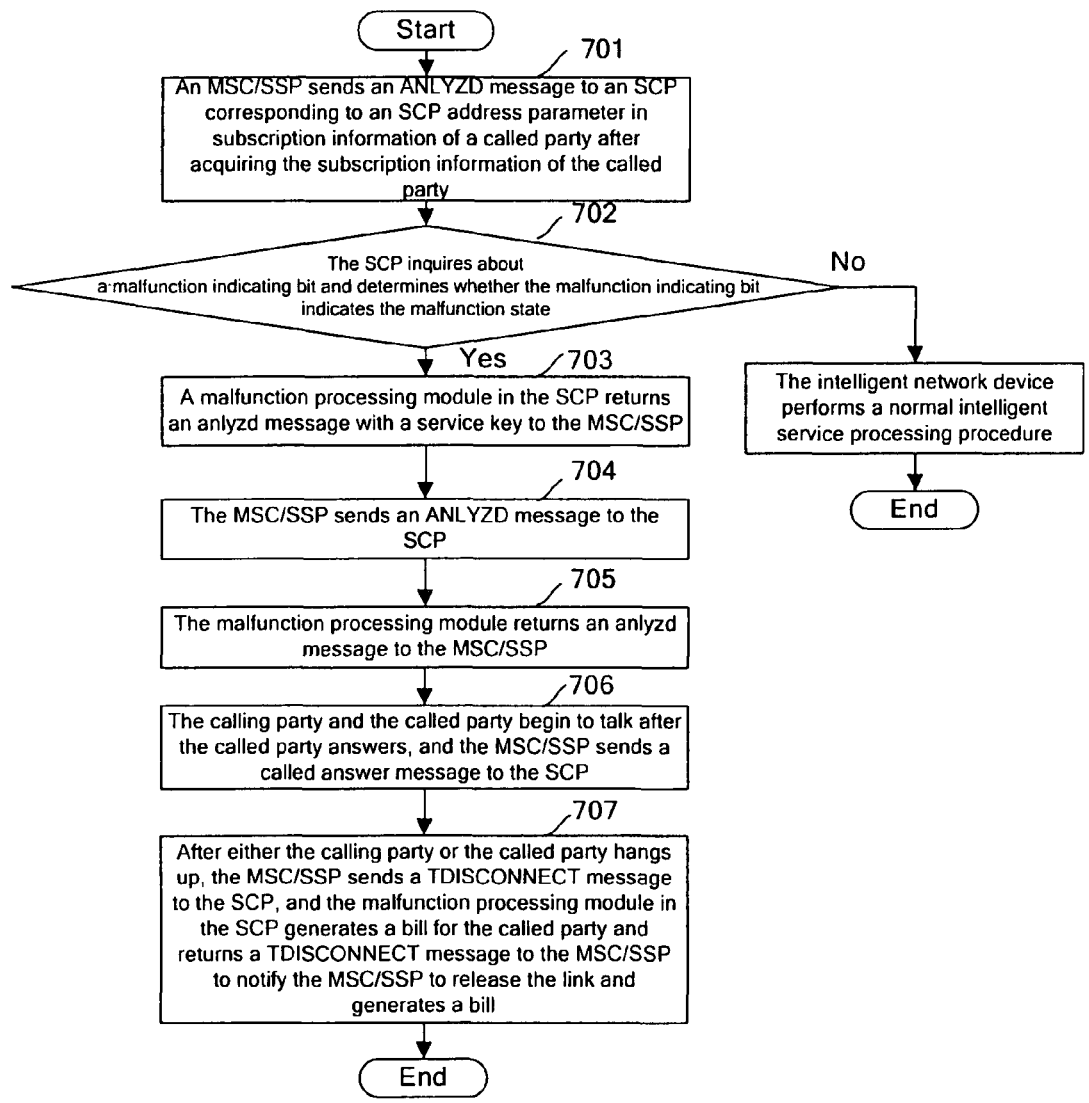
FIG. 7 shows a chart illustrating the called flow of the third embodiment of the invention.

The difference between the called procedure and the calling procedure in this embodiment is that, whether the called number is a VPN number is not determined in the called procedure because the actual called number has been determined. The called procedure is shown in FIG. 7 and the specific steps are as follows.

Step 701: an MSC/SSP sends an ANLYZD message to an SCP corresponding to an SCP address parameter in subscription information of a called party after acquiring the subscription information of the called party.

The specific implementation procedure for acquiring the subscription information of the called party by interaction with the home location register of the called party by the MSC/SSP in this step and the foregoing Step 301 is the same with that in the prior art and will not be described in detail herein.

Step 702: after receiving the ANLYZD message, the SCP inquires about a malfunction indicating bit and determines whether the malfunction indicating bit indicates the malfunction state, if the malfunction indicating bit indicates the malfunction state, Step 703 is performed; otherwise, a normal intelligent service processing procedure is performed.

Step 703: a malfunction processing module in the SCP returns an anlyzd message with a service key to the MSC/SSP.

Step 704: the MSC/SSP sends an ANLYZD message to the SCP, and both the message and the ANLYZD message in Step 702 are the same with those in the prior art.

Step 705: the malfunction processing module returns an anlyzd message with a service key to the MSC/SSP, and the MSC/SSP waits for the answering of the called party after receiving the anlyzd message.

Step 706: the calling party and the called party begin to talk after the called party answers, and the MSC/SSP sends a called answer (TANSWER) message to the SCP.

Step 707: after either the calling party or the called party hangs up, the MSC/SSP sends a called release message (TDISCONNECT) to the SCP, and the malfunction processing module in the SCP generates a bill for the called party and returns a called release response message (tdisconnect) to the MSC/SSP to notify the MSC/SSP to release the link and generates a bill, then the current procedure is terminated.

A fourth embodiment implements the method in accordance with the invention in a Public Switched Telephone Network (PSTN) intelligent network system. The implementation procedure is substantially the same with the first embodiment and the second embodiment of the invention, and the differences are that a service triggering method is different and there is no called intelligent service procedure. The service trigger method is different, that is, the intelligent service is not triggered according to subscription information but according to an access code when the intelligent service is triggered; there is no called intelligent service procedure, that is, a calling switch connects a called switch directly after receiving a connect (CONNECT) message or a continue (CONTINUE) message sent by the calling SCP.

As can be seen from the above descriptions of the specific embodiments of the invention, an intelligent network device returns a message to an exchange device to notify the exchange device to perform an ordinary call processing after detecting its own malfunction. Therefore, calls still get proceeded after the intelligent network device malfunctions, and the losses of the subscribers and operators are reduced. In addition, in the embodiments, the intelligent network device determines whether a called number is a VPN short number, and then performs different processing for a called VPN short number and a called ordinary number after its own malfunction is detected. Furthermore, in the embodiments, determining in each service by the intelligent network device whether its components malfunction is avoided by setting a malfunction indicating bit. Thus, loads on the intelligent network device are reduced.

The foregoing is specific embodiments of the invention and is not for use in limiting the invention. Any modification, equivalent substitution, and improvement within the spirit and principle of the invention should be covered in the protection scope of the invention.

What is claimed is:

1. A method for use in an intelligent network system call proceeding, comprising:
    setting a malfunction indicator in a service control point (SCP), wherein the malfunction indicator indicates whether one or more components of the SCP has malfunctioned;
    receiving, by the SCP, a service request from an exchange device of a calling party;
    determining, by the SCP, whether a malfunction of the one or more components of the SCP has occurred according to the malfunction indicator; and
    instructing, by the SCP, the exchange device to build a connection to another exchange device of a called party if the malfunction has occurred, or
    processing the service request if the malfunction has not occurred.

2. The method of claim 1,
    wherein the malfunction indicator is that it indicates a malfunction state when the malfunction occurs, and a normal state when the malfunction does not occur.

3. The method of claim 1, wherein the one or more components of the SCP comprise a service data unit and a database of the SCP.

4. The method of claim 1, further comprising:
    before instructing the exchange device to build the connection to another exchange device of a called party if the malfunction has occurred, if a called number in the service request is a Virtual Private Network (VPN) short number, sending a message including a prompt voice to be played by a voice playing device,
    wherein the voice playing device plays the prompt voice, and releases the call.

5. An intelligent network system, comprising:
    an exchange device, configured to send a service request from a calling party;
    a malfunction processing apparatus, configured to:
    set a malfunction indicator, wherein the malfunction indicator indicates whether one or more components of a Service Control Point (SCP) has malfunctioned,
    receive the service request from the exchange device; and
    determine whether a malfunction of the one or more components of the SCP has occurred according to the malfunction indicator,
    instruct the exchange device to build a connection to another exchange device of a called party if the malfunction has occurred; or
    processing the service request if the malfunction has not occurred.

6. The system of claim 5, wherein the malfunction indicator indicates a malfunction state when the malfunction occurs, and a normal state when the malfunction does not occur.

7. The system of claim 5, wherein the malfunction processing apparatus further comprises:
    a bill generating, configured to generate a bill for at least one of the calling party and the called party after a call is terminated, and send a message for releasing the call to the exchange device of the calling party or the called party.

8. The system of claim 5, wherein the malfunction processing apparatus is located in the SCP.

9. The system of claim 5, wherein the intelligent network system further comprises a unit configured to determine whether a called number in the service request is a Virtual Private Network (VPN) short number, and if the called number is the VPN short number, send a message including a prompt voice to a voice playing device for the voice playing device to play the prompt voice.

10. A Service Control Point (SCP) for a call proceeding, comprising:
- a receiver, configured to receive a service request from an exchange device of a calling party; and
- a processor, configured to set a malfunction indicator, wherein the malfunction indicator indicates whether one or more components of the SCP has malfunctioned; determine whether a malfunction of the one or more components of the SCP has occurred according to the malfunction indicator; and
- instruct the exchange device to build a connection to another exchange device of a called party if a malfunction has occurred; or
- process the service request if the malfunction has not occur.

11. The SCP of claim 10, wherein the malfunction indicator indicates a malfunction state when the malfunction occurs, and a normal state when the malfunction does not occur.

12. The SCP of claim 10, wherein the SCP further comprises a bill generator configured to generate a bill for at least one of a calling party and a called party after a call is terminated, and a transmitter configured to send a message for releasing the call to the exchange device of the calling party or the called party.

13. The SCP of claim 10, further comprising a transmitter, wherein the processor is further configured to determine whether a called number in the service request is a Virtual Private Network (VPN) short number, and if the called number is the VPN short number, instruct the transmitter to send a message including a prompt voice to a voice playing device for the voice playing device to play.

* * * * *